Figure 1:
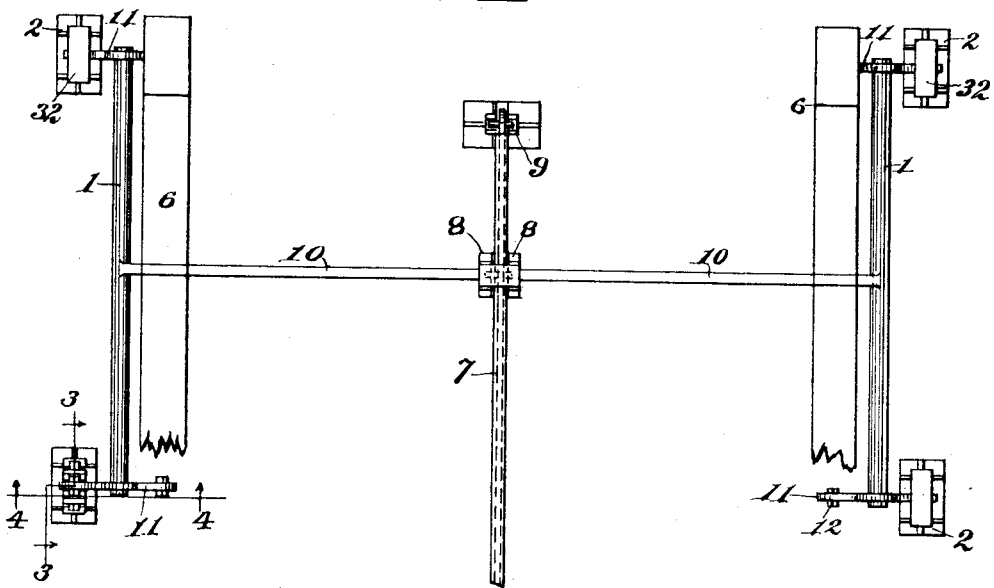

H. G. NORDEEN.
WEIGHING SCALE.
APPLICATION FILED MAY 26, 1913.

1,108,610.

Patented Aug. 25, 1914.

2 SHEETS—SHEET 1.

Witnesses.
George H. Morse.
Elva Knapp.

Inventor.
Herman G. Nordeen
By
Attorney.

H. G. NORDEEN.
WEIGHING SCALE.
APPLICATION FILED MAY 26, 1913.
1,108,610.
Patented Aug. 25, 1914.
2 SHEETS—SHEET 2.
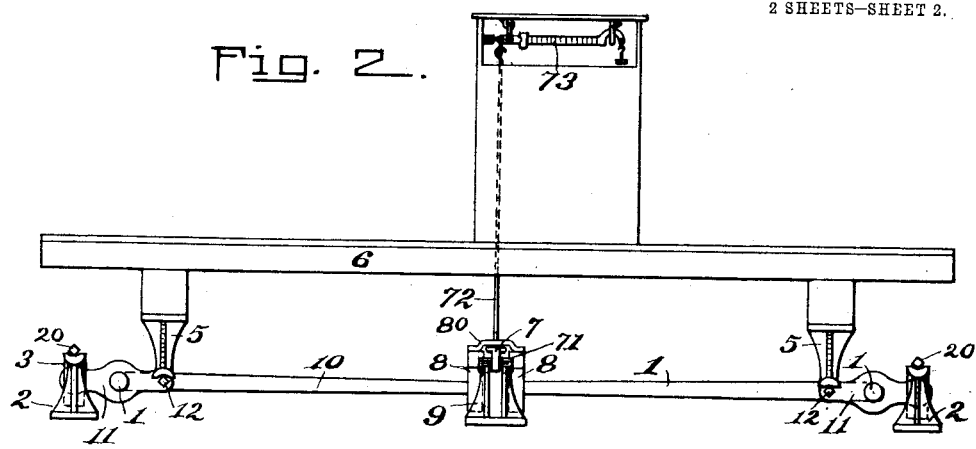
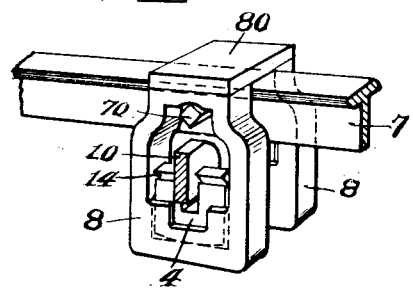
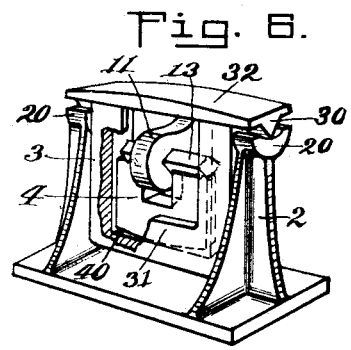
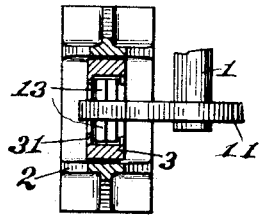
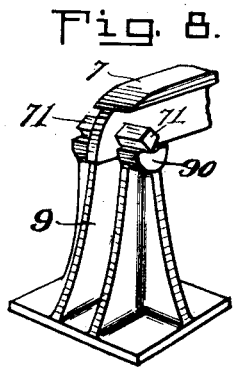
Witnesses.
George H. Morse.
Elva Knapp.
Inventor:
Herman G. Nordeen.
By Schuyler Durgee
Attorney.
THE NORRIS PETERS CO., PHOTO-LITHO., WASHINGTON, D. C.

UNITED STATES PATENT OFFICE.

HERMAN G. NORDEEN, OF EVERETT, WASHINGTON.

WEIGHING-SCALE.

1,108,610. Specification of Letters Patent. Patented Aug. 25, 1914.

Application filed May 26, 1913. Serial No. 769,828.

*To all whom it may concern:*

Be it known that I, HERMAN G. NORDEEN, a citizen of the United States, residing at Everett, in the county of Snohomish, State of Washington, have invented a new and useful Improvement in Weighing-Scales, of which the following is a specification.

My invention relates to weighing scales, and particularly to that type commonly known as platform scales or farm scales.

The object of my invention is to improve and simplify such scales, both in construction and maintenance.

My invention comprises the novel parts and combinations of parts which will be hereinafter described and particularly pointed out in the claims.

In the drawings I have shown my invention in the form which is now preferred by me, when applied to this particular type of scales.

Figure 4:
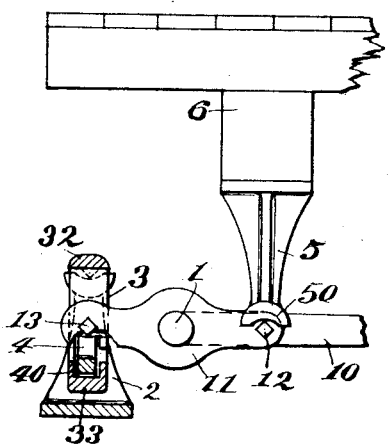
Figure 3:
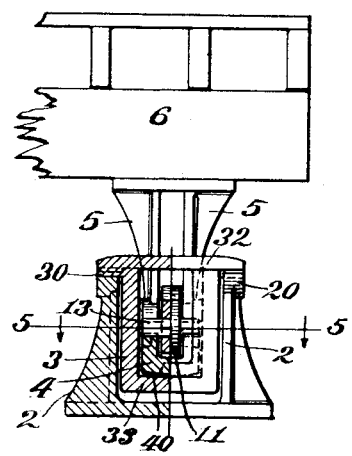

Figure 1 is a plan view of the lever system which supports the platform and which transfers the weight placed thereon to the indicating mechanism. Fig. 2 is a side elevation, showing the levers, platform and indicating mechanism. Fig. 3 is an elevation, partly in section, showing one of the lever-supporting stands with the lever in place thereon. Fig. 4 is a similar view taken from a position at right angles to that of Fig. 3. Fig. 5 is a sectional plan, taken on the line 5—5, of Fig. 3. Fig. 6 is a perspective of one of these stands with a portion broken away and the end of the lever showing. Fig. 7 is a perspective showing the mechanism employed in connecting the primary levers with the secondary lever. Fig. 8 shows, in perspective, the support for the secondary lever.

I have herein shown my invention embodied in a platform scales, such as are employed in weighing wagons and their loads. It will be herein described in connection with such a scale, it being distinctly understood that this is done without any intention of limiting my invention to this class of scale and without intending to bar it from application to any kind of scale, or a scale for any use desired, or of any size.

At each corner of the platform I provide a stand 2, such as is shown in detail in Figs. 3, 4, 5, and 6, these forming the fulcrum supports for the primary levers, or those upon which the platform is carried. The primary levers are of a compound structure, consisting of a shaft 1 having a lever 11 fixed to each end thereof and a lever 10 fixed to its middle part. The levers 11 are secured by their middle portions to the shafts 1 and are provided at each end with fulcrum or bearing pins 12 and 13, these partaking of the character of what is commonly known as a knife edge bearing. These are shown as made of a square pin having the bearing upon an edge. The platform 6 has standards 5 secured thereto and having recessed bearing ends 50 resting upon the pins 12. The standards upon which the pins 13 at the opposite ends of levers 11 rest, are of a more complicated structure. The member 4 with which the pins 13 engage, are of a U-shape, the pin engaging surfaces being shallow cavities in the upper ends of the branches thereof. The lower portion of the U-shape is slightly rounded, as shown at 40, so that it may automatically adjust itself to slight inequalities in the settling of the member supporting it.

The member which directly supports the part 4, consists of a yoke piece 3, which is of rectangular outline of a size to receive the member 4 within its opening. To retain the member 4 securely therein, I have provided the yoke piece with flanges 31, which embrace the edges of the bearing member 4. The side bars of the yoke piece 3 are connected at their upper ends by a bar 32, which projects to form angular bearing lugs 30 which rest upon the upper ends 20, of standards 2 at each side thereof. The secondary lever 7, which at one end connects with the scale beam or an equivalent indicating mechanism, is fulcrumed at one end upon a standard 9, by means of squared pins 71 which rest in bearing sockets 90 on the standard. At a point intermediate its ends it supports two stirrups 8, by means of other square pivot pins 70, and these stirrups support the ends of the levers 10. The construction of these stirrups and the support for the levers 10, is like, in its essentials, to that described as used with the four bearings for supporting the primary levers. This comprises the U-shaped member 4 which carries the square bearing pins 14, and the member 4 is held within a channel or seat in the stirrup 8. The two stirrups 8 are connected, as by a bar 80, or in any other manner which will prevent separation and slipping off the pins 14. The secondary lever 7 is connected at its free end with the indicating mechanism by any suitable means. I have herein shown a rod 72 as extending upward to the scale beam 73. This mechanism may be of any type found suitable.

With the above construction, a weight placed at any point upon the platform will indicate exactly the same weight as it will when placed at any other point. Central or eccentric placing of the weight in no wise affects the weight indication, as its leverage effect is identical irrespective of its location.

I claim as my invention:

1. A pivot supporting means for scales comprising two separated standards provided with pivot-pin-receiving sockets in their upper ends, a yoke frame fitting between said standards and having projecting bearing pins adapted to bear upon said sockets in the standards, and a U-shaped bearing member fitting within said yoke frame and having a rounded bottom-bearing surface and bearing-pin-receiving recesses in the upper end faces of its arms, the yoke frame having flanges extending over the edges of said bearing member to retain it in place.

2. A pivot connection for scales comprising a yoke frame having projecting pivot-bearing members at one end and inwardly projecting flanges, a bearing member having a U-shape with its bottom surface slightly rounded and pin-receiving recesses in its upper end faces and adapted to engage with said flanges of the yoke frame to be held in place thereby.

3. A pivot connection for scale levers comprising a yoke frame having a pivot suspension bearing at its upper end, and a U-shaped bearing member fitting between the sides of said yoke frame and having pivot bearings upon the upper ends of its side arms, said two members having supporting bearing surfaces of a relatively rounded character, and one having projections engaging the other to hold the two in proper relative position.

HERMAN G. NORDEEN.

Witnesses:
SCHUYLER DURYEE,
B. E. PADGETT.